(12) United States Patent
Hirabayashi et al.

(10) Patent No.: US 7,170,710 B2
(45) Date of Patent: Jan. 30, 2007

(54) MAGNETIC RECORDING AND REPRODUCTION APPARATUS

(75) Inventors: Koichiro Hirabayashi, Osaka (JP); Akio Konishi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 421 days.

(21) Appl. No.: 10/801,972

(22) Filed: Mar. 16, 2004

(65) Prior Publication Data

US 2004/0201915 A1  Oct. 14, 2004

(30) Foreign Application Priority Data

Mar. 18, 2003  (JP)  ............... 2003-073841

(51) Int. Cl.
*G11B 15/61* (2006.01)
*G11B 15/665* (2006.01)
*G11B 15/60* (2006.01)

(52) U.S. Cl. .......................... 360/85; 360/95
(58) Field of Classification Search ............... 360/84, 360/85, 96.5, 95
See application file for complete search history.

(56) References Cited

U.S. PATENT DOCUMENTS

| 3,756,610 | A | * | 9/1973 | Naegele et al. | ........ 360/130.21 |
|---|---|---|---|---|---|
| 3,761,906 | A | * | 9/1973 | Finster et al. | ................. 360/42 |
| 4,541,024 | A | * | 9/1985 | Sieben | ......................... 360/85 |
| 4,736,259 | A | * | 4/1988 | Nonoyama | .................... 360/84 |
| 6,172,841 | B1 | * | 1/2001 | Kobayashi | ................ 360/96.5 |
| 2002/0176204 | A1 | * | 11/2002 | Saito et al. | .................... 360/85 |

FOREIGN PATENT DOCUMENTS

| JP | 07296467 | A | * | 11/1995 |
|---|---|---|---|---|
| JP | 08212637 | A | * | 8/1996 |
| JP | 2002367258 | A | * | 12/2002 |

* cited by examiner

*Primary Examiner*—William J Klimowicz
(74) *Attorney, Agent, or Firm*—Renner, Otto, Boisselle & Sklar, LLP

(57) ABSTRACT

A magnetic recording and reproduction apparatus includes a cylinder; a first chassis section; a second chassis section; and at least first, second and third tape guide members. The second chassis section is movable between a first position and a second position. When the second chassis section is in the first position, a supply reel, the first tape guide member, the second tape guide member, the third tape guide member and the cylinder are arranged in this order, such that only the first, second and third tape guide members guide the magnetic tape between the supply reel and the cylinder. When the second chassis section is in the first position, the first tape guide member is in contact with a magnetic surface of the magnetic tape, and the second and third tape guide members are in contact with the non-magnetic surface of the magnetic tape.

8 Claims, 6 Drawing Sheets

MAGNETIC RECORDING AND REPRODUCTION APPARATUS

This non-provisional application claims priority under 35 U.S.C., §119(a). on Patent Application No. 2003-073841 filed in Japan on Mar. 18, 2003, the entire contents of which are hereby incorporated by reference.

BACKGROUND OF THE INVENTION

1. Field of the Invention

The present invention relates to a magnetic recording and reproduction apparatus capable of recording information to and/or reproducing information from a magnetic tape.

2. Description of the Related Art

FIG. 7 shows a conventional magnetic recording and reproduction apparatus 700 disclosed in Japanese Laid-Open Publication No. 11-273194.

The magnetic recording and reproduction apparatus 700 includes a main chassis 708 and a sub chassis 703 movable with respect to the main chassis 708. A cassette 702 accommodating a magnetic tape 701 is mountable on the sub chassis 703.

The magnetic recording and reproduction apparatus 700 further includes a cylinder 738, an S reel stand 704, a T reel stand 705, and a capstan 750. The cylinder 738, the S reel stand 704, the T reel stand 705, and the capstan 750 are provided on the main chassis 708.

The magnetic recording and reproduction apparatus 700 further includes a plurality of tape guide members for guiding the magnetic tape 701. The plurality of tape guide members include a tension post 714, an S3 post 749, an S2 post 744, an S1 post 745, a T1 post 746, a T2 post 747, a T3 post 751, and a T4 post 730. The tension post 714 is provided for pulling out the magnetic tape 701 from the cassette 702 in order to, for example, supply the magnetic tape 701 with an appropriate tension. Accordingly, the tension post 714 receives a large pressure from the magnetic tape 701.

The magnetic tape 701 is pulled out from the cassette 702 by the sub chassis 703 moving relative to the main chassis 708 and at least one of the plurality of tape guide members moving with respect to the main chassis 708. By the plurality of tape guide members guiding the magnetic tape 701 such that the magnetic tape 701 is wound around the cylinder 738, a tape running path in play mode is formed. The tape running path in play mode is a tape running path by which information recording to the magnetic tape 701, information reproduction from the magnetic tape 701, and fast-forwarding of the magnetic tape 701 are possible.

Hereinafter, the tape running path in play mode will be described in detail.

The magnetic tape 701 is supplied from a supply reel (not shown) included in the cassette 702. The magnetic tape 701 supplied from the supply reel is sequentially wound around the tension post 714, and the S3 post 749 provided on the main chassis 708, the S2 post 744 and the S1 post 745.

In compliance with the standards regarding the tape recording pattern, the magnetic tape 701 is wound around the cylinder 738 over a prescribed angle and a prescribed tilt. Then, the magnetic tape 701 is sequentially wound around the T1 post 746, the T2 post 747 and the T3 post 751.

The magnetic tape 701 is then sequentially wound around the capstan 750 and the T4 post 730 and is wound around a take-in reel (not shown) included in the cassette 702.

The above-described conventional magnetic recording and reproduction apparatus have the following problems.

While the tape running path in play mode is formed, the tension post 714, the S3 post 749, the S2 post 744 and the S1 post 745 guide the magnetic tape 701 between the supply reel and the cylinder 738.

Since the magnetic tape 701 is guided by so many tape guide members, the contact area between the magnetic tape 701 and the tape guide members is enlarged, increasing the friction therebetween. This increases the tension of the magnetic tape 701 while the magnetic tape 701 is running. As a result, the magnetic tape 701 is easily damaged while running.

Also, since the magnetic tape 701 is guided by so many tape guide members, the distance between these tape guide members is shorter. Therefore, in a magnetic recording and reproduction apparatus using a so-called twisted tape running path, the twisting amount of the magnetic tape 701 cannot be increased. This unfavorably restricts the design freedom of the tape running path.

The above-mentioned shorter distance between the tape guide members results in the tape running stability being significantly influenced by the variance in, for example, the tilt and positional precision of the tape guide members. This requires the tilting and positioning of the tape guide members to be controlled with high precision. This prevents the simplification and reduction of the size and cost of the components of the magnetic recording and reproduction apparatus.

In the case where the magnetic recording and reproduction apparatus includes a main chassis and a sub chassis movable with respect to the main chassis, the space for locating the tape guide members is very small. Therefore, it is not desirable to provide a large number of components acting as tape guide members for forming a tape running path.

Since the magnetic tape 701 supplied from the supply reel is wound around the tension post 714 via no other tape guide member, the position of the tension post 714 is not stabilized. This tendency is strong since the tension post 714 is movable with respect to the chassis section. This significantly reduces the tape running stability of the magnetic tape 701.

SUMMARY OF THE INVENTION

According to one aspect of the invention, a magnetic recording and reproduction apparatus includes a cylinder for recording information to and/or reproducing information from a magnetic tape having a magnetic surface and a non-magnetic surface; a first chassis section having the cylinder provided thereon; a second chassis section movable with respect to the first chassis section, on which a cassette accommodating a supply reel for supplying the magnetic tape is mountable; and at least three tape guide members including a first tape guide member, a second tape guide member and a third tape guide member. The second chassis section is movable between a first position and a second position. The first position is the position at which the information recording to and/or information reproduction from the magnetic tape is possible. The second position is the position at which the information recording to and/or information reproduction from the magnetic tape is not possible. When the second chassis section is in the first position, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder. When the second chassis section is in the first position, the first tape guide member is in contact with the magnetic surface, the second tape guide member is in contact with the non-magnetic surface, and the third tape guide member is in contact with the non-magnetic surface.

In one embodiment of the invention, when the second chassis section is in the first position, the magnetic tape is wound around the second tape guide member over an angle of 100 degrees or greater and 200 degrees or less, and the magnetic tape is wound around the third tape guide member over an angle of 45 degrees or greater and 135 degrees or less.

In one embodiment of the invention, when the second chassis section is in the first position, an output line of the second tape guide member and an input line of the third tape guide member are not in the same plane.

In one embodiment of the invention, where a vertical post is a post having a winding contact line with the magnetic tape which is substantially vertical to a tape running direction of the magnetic tape when the second chassis section is in the first position, and a tilted post is a post having a winding contact line with the magnetic tape which is not vertical to the tape running direction of the magnetic tape when the second chassis section is in the first position; the first tape guide member is a vertical post, the second tape guide member is a tilted post, and the third tape guide member is a vertical post.

According to another aspect of the invention, a magnetic recording and reproduction apparatus includes a cylinder for recording information to and/or reproducing information from a magnetic tape having a magnetic surface and a non-magnetic surface; a first chassis section having the cylinder provided thereon; a second chassis section movable with respect to the first chassis section, on which a cassette accommodating a supply reel for supplying the magnetic tape is mountable; and at least three tape guide members including a first tape guide member, a second tape guide member and a third tape guide member. The second chassis section is movable between a first position and a second position. The first position is the position at which the information recording to and/or information reproduction from the magnetic tape is possible. The second position is the position at which the information recording to and/or information reproduction from the magnetic tape is not possible. When the second chassis section is in the first position, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder. When the second chassis section is in the first position, $L_1 \geq 2B$, where B is a width of the magnetic tape, and $L_1$ is a distance between an output point of the second tape guide member and an input point of the third tape guide member. The output point of the second tape guide member is an intersection of the output line of the second tape guide member and a center line of the magnetic tape, and the input point of the third tape guide member is an intersection of the input line of the third tape guide member and the center line of the magnetic tape.

In one embodiment of the invention, when the second chassis section is in the first position, an output line of the second tape guide member and an input line of the third tape guide member are not in the same plane.

In one embodiment of the invention, when the second chassis section is in the first position, $L_2 \geq 2B$, where $L_2$ is a distance between an output point of the supply reel and an input point of the first tape guide member. The output point of the supply reel is an intersection of the output line of the supply reel and the center line of the magnetic tape; and the input point of the first tape guide member is an intersection of the input line of the first tape guide member and the center line of the magnetic tape.

In one embodiment of the invention, when the second chassis section is in the first position, an output line of the supply reel and an input line of the first tape guide member are not in the same plane.

According to still another aspect of the invention, a magnetic recording and reproduction apparatus includes a cylinder for recording information to and/or reproducing information from a magnetic tape having a magnetic surface and a non-magnetic surface; a first chassis section having the cylinder provided thereon; a second chassis section movable with respect to the first chassis section, on which a cassette accommodating a supply reel for supplying the magnetic tape is mountable; and at least three tape guide members including a first tape guide member, a second tape guide member and a third tape guide member. The second chassis section is movable between a first position and a second position. The first position is the position at which the information recording to and/or information reproduction from the magnetic tape is possible. The second position is the position at which the information recording to and/or information reproduction from the magnetic tape is not possible. When the second chassis section is in the first position, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder. When the second chassis section is in the first position, the first tape guide member is in contact with the magnetic surface, the second tape guide member is in contact with the non-magnetic surface, and the third tape guide member is in contact with the non-magnetic surface. When the second chassis section is in the first position, $L_1 \geq 2B$, where B is a width of the magnetic tape, and $L_1$ is a distance between an output point of the second tape guide member and an input point of the third tape guide member. The output point of the second tape guide member is an intersection of the output line of the second tape guide member and a center line of the magnetic tape; the input point of the third tape guide member is an intersection of the input line of the third tape guide member and the center line of the magnetic tape; and when the second chassis is in the first position, the output line of the second tape guide member and the input line of the third tape guide member are not in the same plane.

Thus, the invention described herein makes possible the advantages of providing a magnetic recording and reproduction apparatus for reducing the number of tape guide members between a supply reel and a cylinder so as to increase the distance between the tape guide members thus increasing the twisting amount of a magnetic tape.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
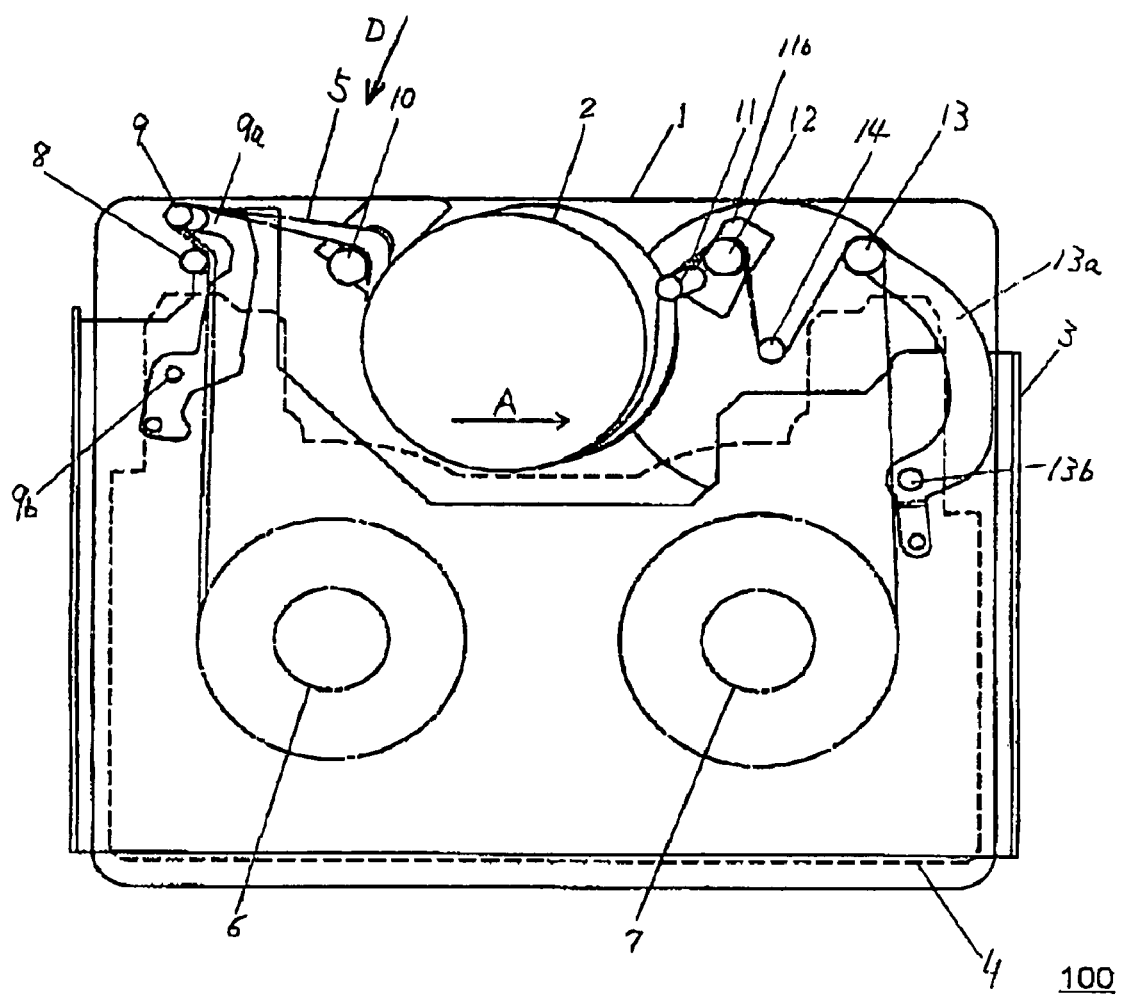
FIG. 1 shows a structure of a magnetic recording and reproduction apparatus in a first state according to one example of the present invention.

FIG. 1 shows a structure of a magnetic recording and reproduction apparatus 100 in a first state in one example according to the present invention.

The magnetic recording and reproduction apparatus 100 includes a main chassis section 1, a cylinder 2, a sub chassis section 3 on which a cassette 4 accommodating a magnetic tape 5 is mountable, and a plurality of tape guide members.

In the first state, information recording to and/or information reproduction from the magnetic tape 5 is possible. For example, after the user mounts the cassette 4 on the sub chassis section 3, the sub chassis section 3 moves toward the cylinder 2 and the plurality of tape guide members pull out the magnetic tape 5 from the cassette 4 and wind the magnetic tape 5 around the cylinder 2 over a prescribed angle. The magnetic recording and reproduction apparatus 100 is placed into the first state in this manner.

In FIG. 1, arrow A represents the running direction of the magnetic tape 5 for recording information on, or reproducing information from, the magnetic tape 5.

Figure 2:
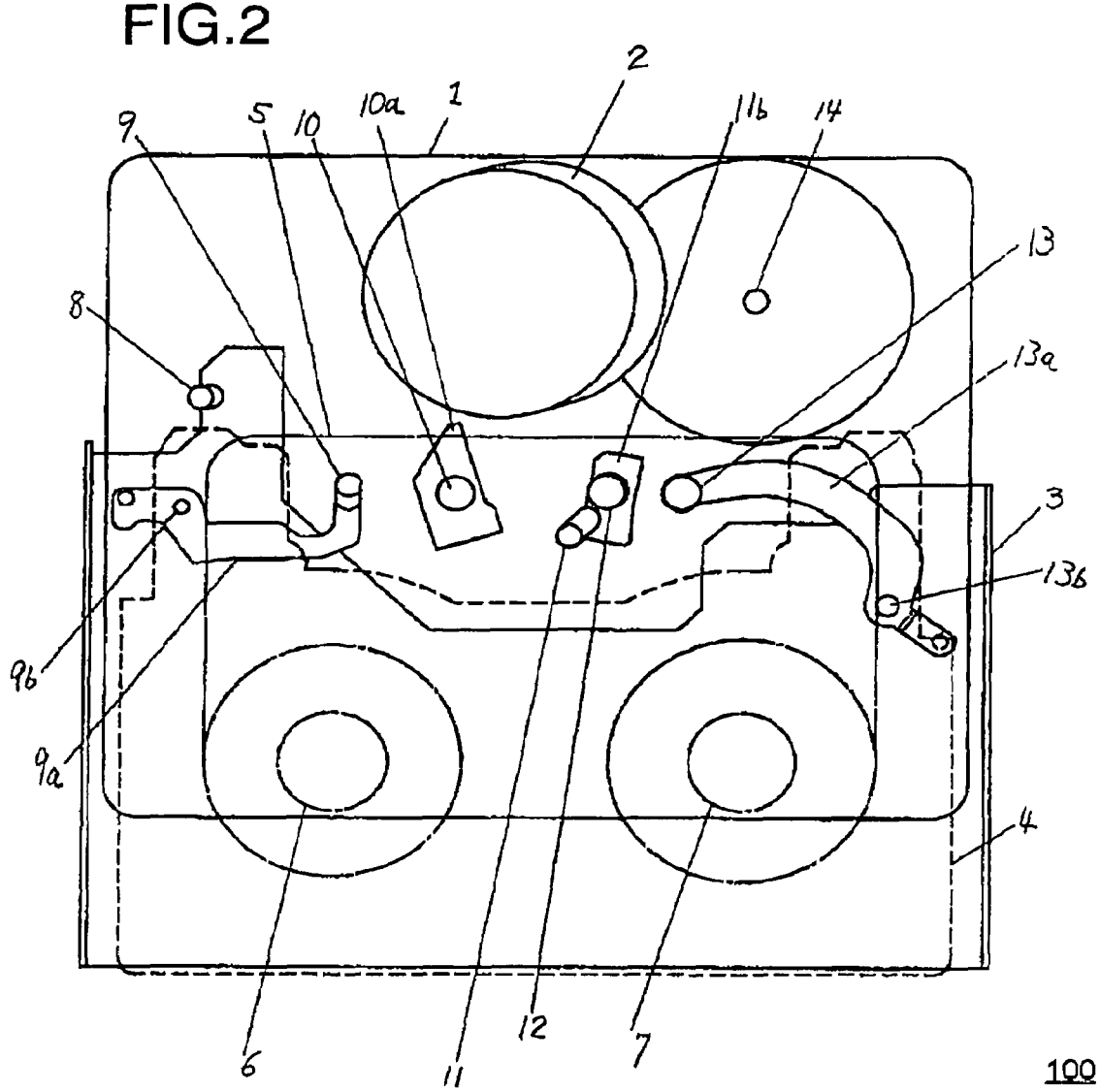
FIG. 2 shows a structure of the magnetic recording and reproduction apparatus shown in FIG. 1 in a second state.

FIG. 2 shows the magnetic recording and reproduction apparatus 100 in a second state.

In the second state, neither information recording to nor information reproduction from the magnetic tape 5 is possible. In the second state, for example, the user can mount the cassette 4 on, or take out the cassette 4 from, the sub chassis section 3.

Hereinafter, a structure of the magnetic recording and reproduction apparatus 100 will be described in detail with reference to FIGS. 1 and 2.

As described above, the magnetic recording and reproduction apparatus 100 includes the main chassis section 1, the cylinder 2 provided on the main chassis section 1, the sub chassis section 3 on which the cassette 4 accommodating the magnetic tape 5 is mountable, and the plurality of tape guide members.

The main chassis section 1 guides the sub chassis section 3 reciprocally moving toward the cylinder 2 or away from the cylinder 2.

The cylinder 2 records information to, and/or reproduces information from, the magnetic tape 5. The magnetic tape 5 has a magnetic surface and a non-magnetic surface.

The sub chassis section 3 is movable with respect to the main chassis section 1. The sub chassis section 3 is movable between a first position when the magnetic recording and reproduction apparatus 100 is in the first state and a second position when the magnetic recording and reproduction apparatus 100 is in the second state.

The cassette 4 accommodates a supply reel 6 and a take-in reel 7. The magnetic tape 5 is wound around the supply reel 6 and the take-in reel 7.

The plurality of tape guide members are, for example, a first tape guide member 8, a second tape guide member 9, a third tape guide member 10, a fourth tape guide member 11, a fifth tape guide member 12 and a sixth tape guide member 13.

The first tape guide member 8 is secured to the sub chassis section 3.

The magnetic recording and reproduction apparatus 100 further includes a first arm 9a and a pivoting shaft 9b.

The second tape guide member 9 is provided on the first arm 9a. The pivoting shaft 9b is provided on the sub chassis section 3. The pivoting shaft 9b pivotably supports the first arm 9a. A driving section (not shown) drives the first arm 9a such that the second tape guide member 9 moves from a position thereof in the second state to a position thereof in the first state as the sub chassis section 3 moves from the second position to the first position.

The magnetic recording and reproduction apparatus 100 further includes a first tape guide moving member 10a.

The third tape guide member 10 is provided on the first tape guide moving member 10a. A driving section (not shown) drives the first tape guide moving member 10a such that the third tape guide member 10 moves from a position thereof in the second state to a position thereof in the first state as the sub chassis section 3 moves from the second position to the first position.

The magnetic recording and reproduction apparatus 100 further includes a second tape guide moving member 11a.

The fourth tape guide member 11 and the fifth tape guide member 12 are provided on the second tape guide moving member 11a. A driving section (not shown) drives the second tape guide moving member 11a such that the fourth tape guide member 11 and the fifth tape guide member 12 move from positions thereof in the second state to positions thereof in the first state as the sub chassis section 3 moves from the second position to the first position.

The magnetic recording and reproduction apparatus 100 further includes a second arm 13a and a pivoting shaft 13b.

The sixth tape guide member 13 is provided on the second arm 13a. The pivoting shaft 13b is provided on the sub chassis section 3. The pivoting shaft 13b pivotably supports the second arm 13a. A driving section (not shown) drives the second arm 13a such that the sixth tape guide member 13 moves from a position thereof in the second state to a position thereof in the first state as the sub chassis section 3 moves from the second position to the first position.

The magnetic recording and reproduction apparatus 100 further includes a capstan 14.

The capstan 14 is provided on the main chassis section 1. A pinch roller (not shown) presses the magnetic tape 5 to the capstan 14. The capstan 14 drives the magnetic tape 5 so as to run.

By the sub chassis section 3 moving from the second position to the first position, the first tape guide member 8, the second tape guide member 9, the third tape guide member 10, the fourth tape guide member 11, the fifth tape guide member 12, and the sixth tape guide member 13 cooperate together to pull out the magnetic tape 5 from the cassette 4 and wind the magnetic tape 5 around the cylinder 2 and the capstan 14.

When the sub chassis section 3 is in the first position, the supply reel 6, the first tape guide member 8, the second tape guide member 9, the third tape guide member 10, and the cylinder 5 are arranged in this order. Thus, only the first tape guide member 8, the second tape guide member 9 and the third tape guide member 10 guide the magnetic tape 5 between the supply reel 6 and the cylinder 2.

The magnetic tape 5 supplied from the supply reel 6 is wound around the first tape guide member 8 secured to the sub chassis section 3 via no other tape guide member, and therefore the tape running stability of the magnetic tape 5 is improved.

When the sub chassis section 3 is in the first position, the first tape guide member 8 is in contact with the magnetic surface of the magnetic tape 5, the second tape guide member 9 is in contact with the non-magnetic surface of the magnetic tape 5, and the third tape guide member 10 is also in contact with the non-magnetic surface.

The tape guide members in contact with the non-magnetic surface of the magnetic tape 5 (the second tape guide member 9 and the third tape guide member 10) are movable with respect to the sub chassis section 3 in order to pull the magnetic tape 5 from the cassette 4.

Figure 3:
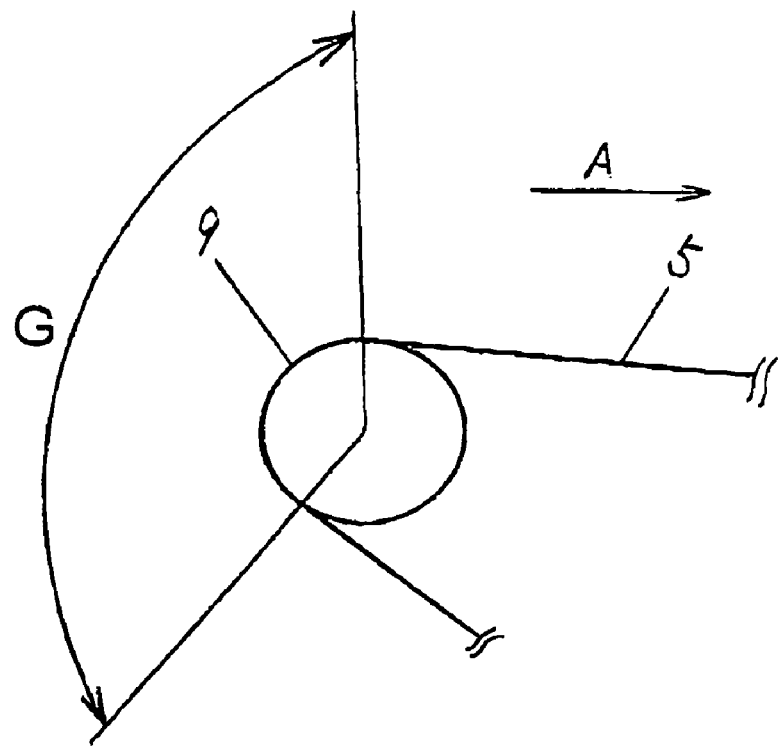
FIG. 3 shows an angle over which a magnetic tape is wound around a second tape guide member.

FIG. 3 shows an angle over which the magnetic tape 5 is wound around the second tape guide member 9. In FIG. 3, the second tape guide member 9 is seen in the axial direction thereof when the sub chassis section 3 is in the first position. The magnetic tape 5 is wound around the second tape guide member 9 over an angle G. For example, angle G is 100 degrees or greater and 200 degrees or less.

Figure 4:
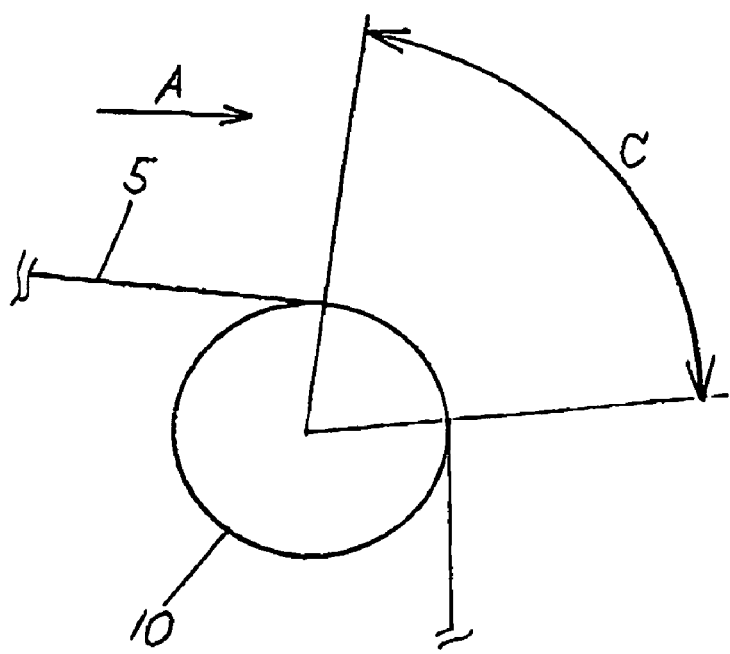
FIG. 4 shows an angle over which a magnetic tape is wound around a third tape guide member.

FIG. 4 shows an angle over which the magnetic tape 5 is wound around the third tape guide member 10. In FIG. 4, the third tape guide member 10 is seen in the axial direction thereof when the sub chassis section 3 is in the first position. The magnetic tape 5 is wound around the third tape guide member 10 over an angle C. For example, angle C is 45 degrees or greater and 135 degrees or less.

Hereinafter, a vertical post and a tilted post when the sub chassis section 3 is in the first position will be described.

The vertical post is vertical to the tape running direction. Namely, in the case where the magnetic tape 5 is wound around the vertical post, the height of the central line and the tilt of the magnetic tape 5 do not change between a portion of the magnetic tape 5 before being wound around the vertical post and a portion of the magnetic tape 5 after being wound around the vertical post.

The tilted post is not vertical to the tape running direction. Namely, in the case where the magnetic tape 5 is wound around the tilted post, the height of the central line and the tilt of the magnetic tape 5 change between a portion of the magnetic tape 5 before being wound around the tilted post and a portion of the magnetic tape 5 after being wound around the tilted post. The amounts of change in the height of the central line and the tilt of the magnetic tape 5 are based on (i) the angle between the tilted post and the tape running direction which is to be wound around the tilted post (input angle of the tape to the post) and (ii) the angle over which the magnetic tape 5 is wound around the tilted post.

Inside the cassette 4, the height of the central line of the magnetic tape 5, the height of the supply reel 6 and the height of the take-in reel 7 are the same. Inside the cassette 4, the magnetic tape 5 is vertical to the tape running direction. For example, in a VTR of a helical scan system, the magnetic tape 5 is wound around the cylinder 2 in the state where the magnetic tape 5 is tilted at a prescribed angle.

When the sub chassis section 3 is in the first position, a "winding contact line" of the first tape guide member 8 with the magnetic tape 5 is substantially vertical to the tape running direction of the magnetic tape 5. Namely, the first tape guide member 8 is a vertical post.

When the sub chassis section 3 is in the first position, a "winding contact line" of the second tape guide member 9 with the magnetic tape 5 is tilted with respect to the tape running direction of the magnetic tape 5. Namely, the second tape guide member 9 is a tilted post.

When the sub chassis section 3 is in the first position, a "winding contact line" of the third tape guide member 10 with the magnetic tape 5 is substantially vertical to the tape running direction of the magnetic tape 5. Namely, the third tape guide member 10 is a vertical post.

Figure 5:
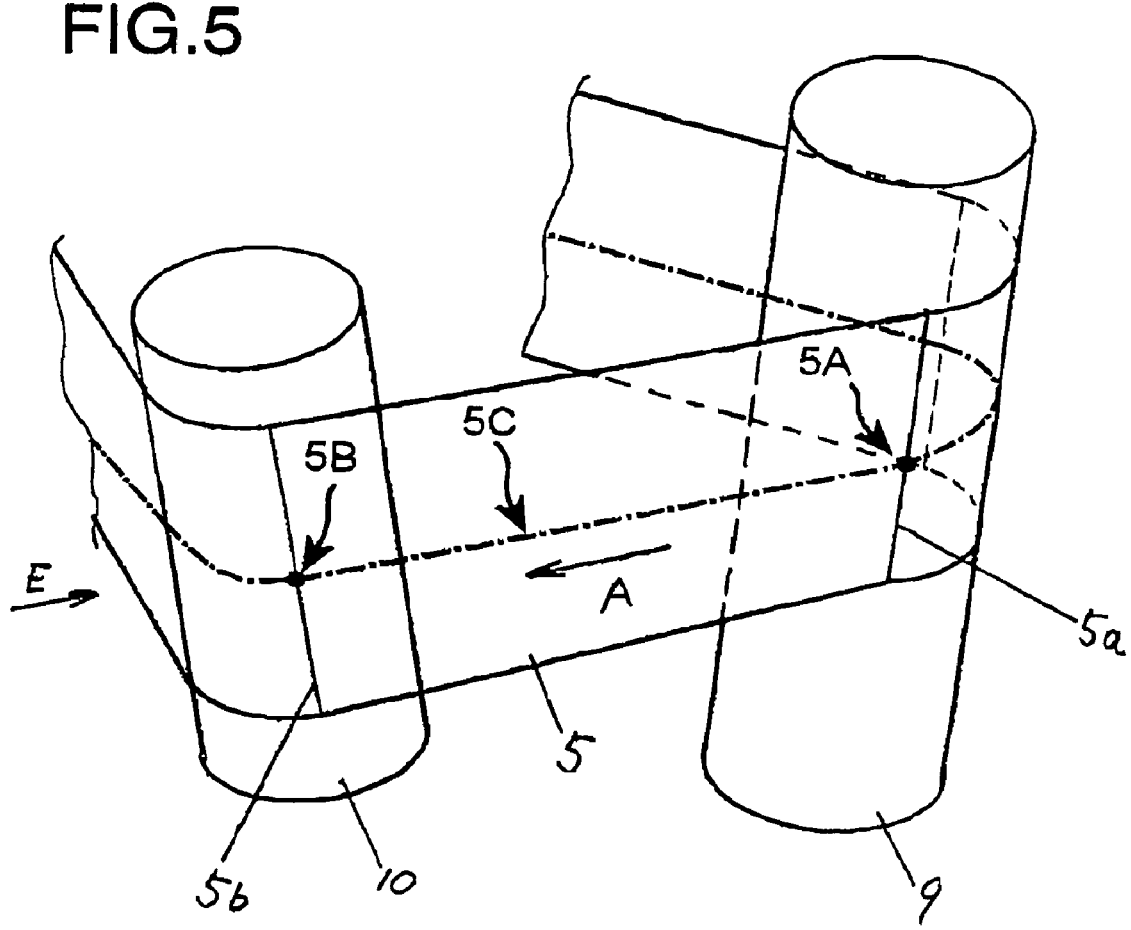
FIG. 5 shows the distance between the second tape guide member and the third tape guide member, and winding contact lines of the second tape guide member and the third tape guide member with the magnetic tape, in the state where a sub chassis section is in the first position.

FIG. 5 shows the distance between the second tape guide member 9 and the third tape guide member 10, the winding contact line of the second tape guide member 9 with the magnetic tape 5, and the winding contact line of the third tape guide member 10 with the magnetic tape 5, in the state where the sub chassis section 3 is in the first position. FIG. 5 shows the second tape guide member 9 and the third tape guide member 10 seen in a direction of arrow D shown in FIG. 1.

In FIG. 5, the magnetic tape 5 runs in the direction of arrow A. Reference numeral 5a represents the winding contact line of the second tape guide member 9 with the magnetic tape 5, i.e., an end line of the contact area between the magnetic tape 5 and the second tape guide member 9. Since the magnetic tape 5 is wound around the second tape guide member 9 until the winding contact line 5a and is separated from the second tape guide member 9 at the winding contact line 5a, the winding contact line 5a is also referred to as an "output line 5a" of the second tape guide member 9. In other words, the output line 5a is the winding contact line of the magnetic tape 5 on the downstream side of the second tape guide member 9.

Reference numeral 5b represents the winding contact line of the third tape guide member 10 with the magnetic tape 5, i.e., an end line of the contact area between the magnetic tape 5 and the third tape guide member 10. Since the magnetic tape 5 is wound around from, i.e., goes into contact with the third tape guide member 10 from the winding contact line 5b, the winding contact line 5b is also referred to as an "input line 5b" of the third tape guide member 10. In other words, the output line 5b is the winding contact line of the magnetic tape 5 on the upstream side of the third tape guide member 10.

Reference numeral 5A, which is the intersection of the output line 5a and a center line 5C of the magnetic tape 5, is referred to as an "output point 5A" of the second tape guide member 9. Reference numeral 5B, which is the intersection of the input line 5b and the center line 5C of the magnetic tape 5, is referred to as an "input point 5B" of the third tape guide member 10.

The second tape guide member 9 and the third tape guide member 10 have the relationship of $L_{23} \geq 2B$. Letter B represents the width of the magnetic tape 5, and $L_{23}$ represents the distance between the output point 5A of the second tape guide member 9 and the input point 5B of the third tape guide member 10.

The output line 5a of the second tape guide member 9 and the input line 5b of the third tape guide member 10 are not in the same plane and are in different planes to each other.

The reason for this is that the magnetic tape 5 is twisted between the output line 5a of the second tape guide member 9 and the input line 5b of the third tape guide member 10. It was experimentally confirmed that when the relationship of $L_{23} \geq 2B$ is fulfilled, a sufficient twisting amount (2 deg or greater) can be guaranteed without spoiling the tape running stability between the second tape guide member 9 and the third tape guide member 10.

The twist of the magnetic tape 5 between the output line 5a and the input line 5b will be described in more detail later with reference to FIG. 6.

It is preferable that the supply reel 6 and the first tape guide member 8 have the relationship of $L_{01} \geq 2B$. Letter B represents the width of the magnetic tape 5, and $L_{01}$ represents the distance between an output point of the supply reel 6 and an input point of the first tape guide member 8. The output point of the supply reel 6 is the intersection of an output line of the supply reel 6 and the center line 5C of the magnetic tape 5. The input point of the first tape guide member 8 is the intersection of an input line of the first tape guide member 8 and the center line 5C of the magnetic tape 5.

The output line of the supply reel 6 (i. e., the winding contact line of the magnetic tape 5 on the downstream side of the supply reel 6) and the input line of the first tape guide member 8 (i.e., the winding contact line of the magnetic tape 5 on the upstream side of the first tape guide member 8) are not in the same plane and are in different planes to each other. The reason for this is that the magnetic tape 5 is twisted between the output line of the supply reel 6 and the input line of the first tape guide member 8. It was experimentally confirmed that when the relationship of $L_{01} \geq 2B$ is fulfilled, a sufficient twisting amount (2 deg or greater) can be guaranteed without spoiling the tape running stability between the supply reel 6 and the first tape guide member 8.

When distance L between two posts (for example, the distance $L_{01}$ between the output point of the supply reel 6 and the input point of the first tape guide member 8, or the distance $L_{23}$ between the output point of the second tape guide member 9 and the input point of the third tape guide member 10) is sufficiently large, the tape running stability can be maintained even when the positions or tilts of the posts are significantly offset from the desired positions or tilts.

Figure 6:
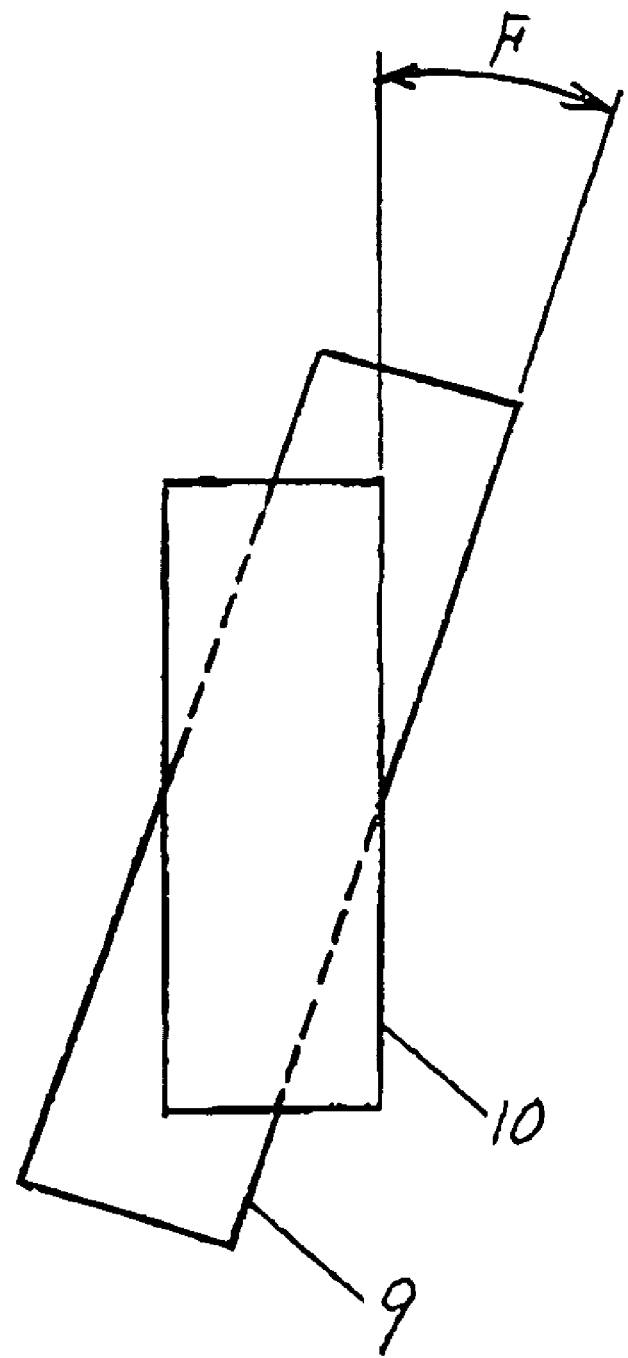
FIG. 6 shows the positional relationship between the second tape guide member and the third tape guide member in the first state of the magnetic recording and reproduction apparatus.
Figure 7:
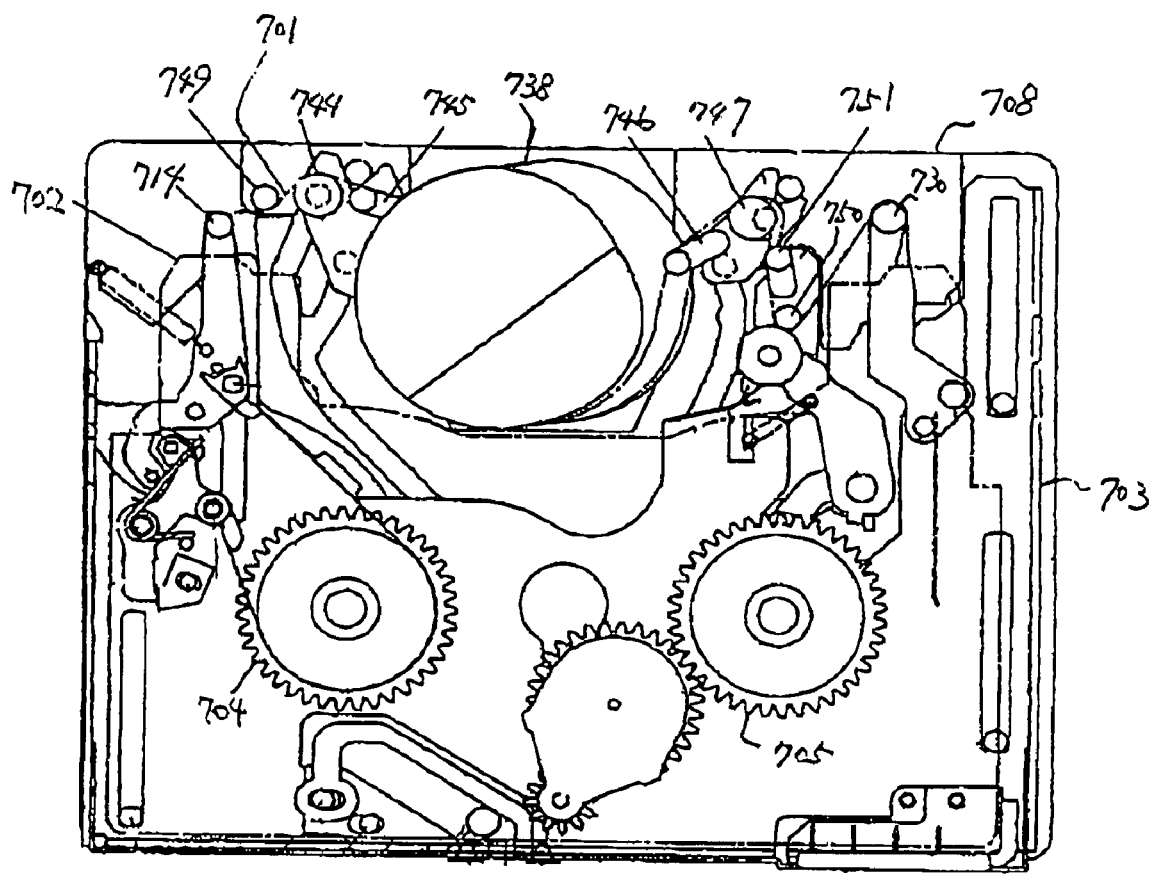
FIG. 7 shows a structure of a conventional magnetic recording and reproduction apparatus.

FIG. 6 shows the positional relationship between the second tape guide member 9 and the third tape guide member 10 in the first state of the magnetic recording and reproduction apparatus 100. FIG. 6 shows the second tape guide member 9 and the third tape guide member 10 seen in a direction of arrow E in FIG. 5.

An angle F is a relative angle between the second tape guide member 9 and the third tape guide member 10. The magnetic tape 5 is twisted at angle F between the second tape guide member 9 and the third tape guide member 10.

When distance L between two posts is sufficiently large, the magnetic tape 5 can be twisted between the two posts. In accordance with the twisting amount (twisting angle) of the magnetic tape 5 between the two posts, the height of the center line or the tilt of the magnetic tape 5 changes between a portion of the magnetic tape 5 before being wound around each post and the portion of the magnetic tape 5 after being wound around each post.

By twisting the magnetic tape 5, design of a tape running path which is not possible by merely providing the vertical post and the tilted post is realized. When the twisting amount is larger, the design freedom of the tape running path is larger, which allows the number of tape guide members to be reduced as compared to the conventional art.

In FIGS. 1 through 6, the angles over which the magnetic tape 5 is wound around the tape guide members, tilts of the tape guide members, and the like are emphasized in order to clarify the relationship between the winding contact lines and the tape guide members.

In the above example, the first tape guide member 8 is provided directly on the sub chassis section 3, but may be provided on the sub chassis section 3 via another element, like the second tape guide member 9 provided on the sub chassis 3 via the first arm 9a.

In the magnetic recording and reproduction apparatus 100, it does not matter whether or not the winding contact lines of the adjacent tape guide members (other than the second tape guide member 9 and the third tape guide member 10), the supply reel 6 and the take-in reel 7 with the magnetic tape 5 are in the same plane.

According to a magnetic recording and reproduction apparatus of the present invention, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder. When the second chassis section is in the second position, the first tape guide member is in contact with the magnetic surface, the second tape guide member is in contact with the nonmagnetic surface, and the third tape guide member is in contact with the nonmagnetic surface.

Accordingly, even in the case where the magnetic recording and reproduction apparatus includes a first chassis section having a cylinder provided thereon and a second chassis section movable with respect to the first chassis section, the number of tape guide members between the supply reel and the cylinder can be reduced.

As a result, the tension of the magnetic tape while the tape is running is prevented from increasing, and thus the tape running stability can be realized (for example, (i) the tape is not damaged: (ii) the tape does not move up and down with respect to the tape running direction while the tape is running; (iii) the tape is not buckled; and (iv) the contact pressure between the cylinder and the magnetic tape is stabilized).

According to a magnetic recording and reproduction apparatus of the present invention, when the second chassis section is in the first position, $L_1 \geq 2B$. B represents the width of the magnetic tape, and $L_1$ represents a distance between an output point of the second tape guide member and an input point of the third tape guide member.

Since $L_1 \geq 2B$ is fulfilled, the distance between adjacent tape guide members is increased. As a result, the tape running stability is not significantly influenced by the variance in the tilt precision or the positional precision of each tape guide member.

Owing to the above, the structure of the magnetic recording and reproduction apparatus is simplified, the size of the apparatus is reduced, and the production cost of the components is lowered.

In addition, since the distance between adjacent tape guide members is increased, the twisting amount of the tape can be increased, and thus the design freedom of the tape running path can be increased.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
   a cylinder for recording information to and/or reproducing information from a magnetic tape having a magnetic surface and a non-magnetic surface;
   a first chassis section having the cylinder provided thereon;
   a second chassis section movable with respect to the first chassis section, on which a cassette accommodating a supply reel for supplying the magnetic tape is mountable; and
   at least three tape guide members including a first tape guide member, a second tape guide member and a third tape guide member;
   wherein:
   the second chassis section is movable between a first position and a second position;
   the first position is the position at which the information recording to and/or information reproduction from the magnetic tape is possible;
   the second position is the position at which the information recording to and/or information reproduction from the magnetic tape is not possible;
   when the second chassis section is in the first position, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder; and
   when the second chassis section is in the first position, the first tape guide member is in contact with the magnetic surface, the second tape guide member is in contact with the non-magnetic surface, and the third tape guide member is in contact with the non-magnetic surface, and the magnetic tape is wound around the second tape guide member over an angle of 100 degrees or greater and 200 degrees or less, and the magnetic tape is wound around the third tape guide member over an angle of 45 degrees or greater and 135 degrees or less.

2. A magnetic recording and reproduction apparatus according to claim 1, wherein when the second chassis section is in the first position, an output line of the second tape guide member and an input line of the third tape guide member are not in the same plane.

3. A magnetic recording and reproduction apparatus according to claim 2, wherein:
   where a vertical post is a post having a winding contact line with the magnetic tape which is substantially vertical to a tape running direction of the magnetic tape when the second chassis section is in the first position, and a tilted post is a post having a winding contact line with the magnetic tape which is not vertical to the tape running direction of the magnetic tape when the second chassis section is in the first position,
   the first tape guide member is a vertical post, the second tape guide member is a tilted post, and the third tape guide member is a vertical post.

4. A magnetic recording and reproduction apparatus, comprising:
   a cylinder for recording information to and/or reproducing information from a magnetic tape having a magnetic surface and a non-magnetic surface;
   a first chassis section having the cylinder provided thereon;
   a second chassis section movable with respect to the first chassis section, on which a cassette accommodating a supply reel for supplying the magnetic tape is mountable; and
   at least three tape guide members including a first tape guide member, a second tape guide member and a third tape guide member;
   wherein:
   the second chassis section is movable between a first position and a second position;
   the first position is the position at which the information recording to and/or information reproduction from the magnetic tape is possible;
   the second position is the position at which the information recording to and/or information reproduction from the magnetic tape is not possible;
   when the second chassis section is in the first position, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder;
   when the second chassis section is in the first position, $L_1 \geqq 2B$,
   where B is a width of the magnetic tape, and $L_1$ is a distance between an output point of the second tape guide member and an input point of the third tape guide member;
   the output point of the second tape guide member is an intersection of the output line of the second tape guide member and a center line of the magnetic tape, and
   the input point of the third tape guide member is an intersection of the input line of the third tape guide member and the center line of the magnetic tape.

5. A magnetic recording and reproduction apparatus, according to claim 4, wherein when the second chassis section is in the first position, an output line of the second tape guide member and an input line of the third tape guide member are not in the same plane.

6. A magnetic recording and reproduction apparatus, according to claim 5, wherein:
   when the second chassis section is in the first position, $L_2 \geqq 2B$;
   where $L_2$ is a distance between an output point of the supply reel and an input point of the first tape guide member;
   the output point of the supply reel is an intersection of the output line of the supply reel and the center line of the magnetic tape; and
   the input point of the first tape guide member is an intersection of the input line of the first tape guide member and the center line of the magnetic tape.

7. A magnetic recording and reproduction apparatus according to claim 6, wherein when the second chassis section is in the first position, an output line of the supply reel and an input line of the first tape guide member are not in the same plane.

8. A magnetic recording and reproduction apparatus, comprising:
   a cylinder for recording information to and/or reproducing information from a magnetic tape having a magnetic surface and a non-magnetic surface;
   a first chassis section having the cylinder provided thereon;

a second chassis section movable with respect to the first chassis section, on which a cassette accommodating a supply reel for supplying the magnetic tape is mountable; and at least three tape guide members including a first tape guide member, a second tape guide member and a third tape guide member;

wherein:

the second chassis section is movable between a first position and a second position;

the first position is the position at which the information recording to and/or information reproduction from the magnetic tape is possible;

the second position is the position at which the information recording to and/or information reproduction from the magnetic tape is not possible;

when the second chassis section is in the first position, the supply reel, the first tape guide member, the second tape guide member, the third tape guide member and the cylinder are arranged in this order, such that only the first tape guide member, the second tape guide member and the third tape guide member guide the magnetic tape between the supply reel and the cylinder;

when the second chassis section is in the first position, the first tape guide member is in contact with the magnetic surface, the second tape guide member is in contact with the non-magnetic surface, and the third tape guide member is in contact with the non-magnetic surface;

when the second chassis section is in the first position, $L_1 \geqq 2B$;

where B is a width of the magnetic tape, and $L_1$ is a distance between an output point of the second tape guide member and an input point of the third tape guide member;

the output point of the second tape guide member is an intersection of the output line of the second tape guide member and a center line of the magnetic tape;

the input point of the third tape guide member is an intersection of the input line of the third tape guide member and the center line of the magnetic tape; and when the second chassis is in the first position, the output line of the second tape guide member and the input line of the third tape guide member are not in the same plane.

\* \* \* \* \*